United States Patent [19]

Blizzard et al.

[11] Patent Number: 5,042,173

[45] Date of Patent: Aug. 27, 1991

[54] MULTI-FUNCTIONAL PERSONNEL RESTRAINT

[75] Inventors: Noah A. Blizzard; Gloria B. Reilly, both of Houston, Tex.

[73] Assignee: Blizzard, Reilly & Meredith

[21] Appl. No.: 475,701

[22] Filed: Feb. 6, 1990

[51] Int. Cl.$^5$ ............................................. A43B 3/000
[52] U.S. Cl. ........................................... 36/1; 36/113; 36/136
[58] Field of Search ...................... 36/136, 1, 134, 113; 182/82; 128/877; 2/DIG. 6, 2.1 A

[56] References Cited

U.S. PATENT DOCUMENTS

| | | | |
|---|---|---|---|
| 819,814 | 5/1906 | Seibert | 36/1 X |
| 1,044,440 | 11/1912 | Bryning | 36/1 |
| 2,583,592 | 1/1952 | Pogue | 182/82 |
| 2,671,971 | 3/1954 | Garretson | 36/113 X |
| 3,081,562 | 3/1963 | Oakley | 36/113 X |
| 3,091,043 | 5/1963 | McCorkle | 36/136 |
| 4,271,610 | 6/1981 | Parrent | 36/136 |
| 4,396,092 | 8/1983 | Thompson | 182/82 X |
| 4,457,510 | 7/1984 | Pertschuk | 2/DIG. 6 X |
| 4,709,782 | 12/1987 | Lipinski | 182/82 X |

FOREIGN PATENT DOCUMENTS 1030114  4/1978  Canada ..................................... 36/1

Primary Examiner—Paul T. Sewell
Assistant Examiner—Ted Kavanaugh
Attorney, Agent, or Firm—Jackson & Walker

[57] ABSTRACT

A multi-functional personnel restraint, particularly suited for use by workers in a substantially zero gravity environment comprises a stationary track defined by two rails which are spring biased to a minimum spacing position. The rails respectively carry a pair of parallel, opposed grooves on their inner surfaces. The grooves are engagable by cleats attached to the bottoms of the shoes of the person requiring restraint. The cleats are engagable with the grooves by a pivotal movement in a vertical plane, thus substantially balancing vertical forces imparted on the shoe or shoes during the groove insertion movement.

8 Claims, 3 Drawing Sheets

MULTI-FUNCTIONAL PERSONNEL RESTRAINT

BACKGROUND OF THE INVENTION

1. FIELD OF THE INVENTION

The invention relates to a method and apparatus for restraining one or both feet of a person to eliminate vertical movements of the person while permitting horizontal pivotal movements of the restrained person. While not limited thereto, the invention is particularly useful for workers in a micro gravity environment

2. SUMMARY OF THE PRIOR ART

Television broadcasts in recent years have repeatedly shown astronauts floating effortlessly in the cabin or cargo area of a space shuttle. When, however, the performance of work is required in such a micro gravity environment, the lack of gravity presents serious problems, because the slightest push of the feet against the floor or wall will result in the entire body moving away from the work station. Similarly, forces exerted by the hands in performing the work will react on the body to cause a displacement of the worker from his work station. It is, of course, possible for the workers to tie themselves to a fixed position in the compartment but such ties necessarily have to be part of their clothing and whenever any unusual movements of the body are required to effect a particular work function, the ties may very well interfere with such desired bodily movements. A person's shoes can, of course, be clamped to the floor, but this prevents any movements that might be required of the person beyond the clamped position. Moreover, the clamping would generally require the assistance of another person to effectuate.

There is, therefore, a definitive need for a restraint which will operate on the shoes of a person working in a micro gravity environment which will permit the restraint to be imposed on the shoes to prevent movements of the person away from the point of restraint but yet will permit some degree of linear movement and an unlimited degree of pivotal movement of the shoes relative to the restraining device.

SUMMARY OF THE INVENTION

The invention provides a method and apparatus for restraining the foot or feet of a worker in a micro gravity environment to secure one or both feet to a floor, wall or even ceiling of the compartment within which the work is to be accomplished.

Such restraining device comprises an elongated base element, the length of which is selected to correspond to the desired amount of linear movement to be provided for the worker. The base element may be secured to the floor or any other wall of the micro gravity compartment. In the subsequent disclosure, it will be assumed that the base elements are applied to the floor of the compartment.

A pair of restraining bars are mounted in opposed relationship on the vertical side walls of the base element, with the top portions of the bars extending above the top surface of the base element. At least one of the restraining bars is pivotally mounted to the base element to permit the lateral spacing between the restraining bars to be varied. Spring elements are provided to urge the pivotally movable restraining bar toward a minimum spacing position relative to the other bar.

Each of the restraining bars is provided with an elongated groove which are disposed in opposed, parallel relationship. The restraining grooves in turn are engaged by horizontally projecting flanges provided on a cleat mounted on the bottom of each shoe worn by the person to be restrained. The top edges of the restraining bars and the bottom edges of the flanges are provided with convex surfaces so that the insertion of the flanges between the grooves in the restraining bars may be accomplished by a pivotal movement in a vertical plane, thus effecting an upward force on one restraining bar and a balancing downward force on the other restraining bar, hence eliminating any significant resultant force to be exerted upon the person making the restraint connection.

In one modification of the invention, the cleat flange is of circular configuration and incorporates within its structure a ratcheting arrangement permitting relative rotational movement of the flange with respect to the fixedly mounted portion of the cleat. This permits the person utilizing the restraint to effect a pivoting movement of one or both feet relative to the restraining bars and hence substantially increases the body mobility of the foot restrained individual. Furthermore, the circular configuration of the cleat flanges permits the restrained person to "crab-walk" along the length of the restraining bars to shift his linear position with respect to such bars, hence substantially increases the potential work area for the restrained individual.

In another modification of the invention the flange provided on each shoe cleat is of rectangular configuration, having rounded corners, and the long dimension of the rectangular flange is equal to the minimum spacing of the restraining grooves provided in the restraining bars. A pivotal movement then imparted to one foot will effect a lateral separation of the restraining bars. This permits the other foot to be moved linearly along the length of the restraining bars. Pivotal movement of the second foot after such movement will similarly expand the spacing of the restraining bars and permit the first mentioned foot to be moved linearly along the restraining bars to catch up with the position of the second foot.

Further objects and advantages of the invention will be readily apparent to those skilled in the art from the following detailed description, taken in conjunction with the annexed sheets of drawings on which are shown several preferred embodiments of the invention.

DESCRIPTION OF PREFERRED EMBODIMENTS

Figure 1:
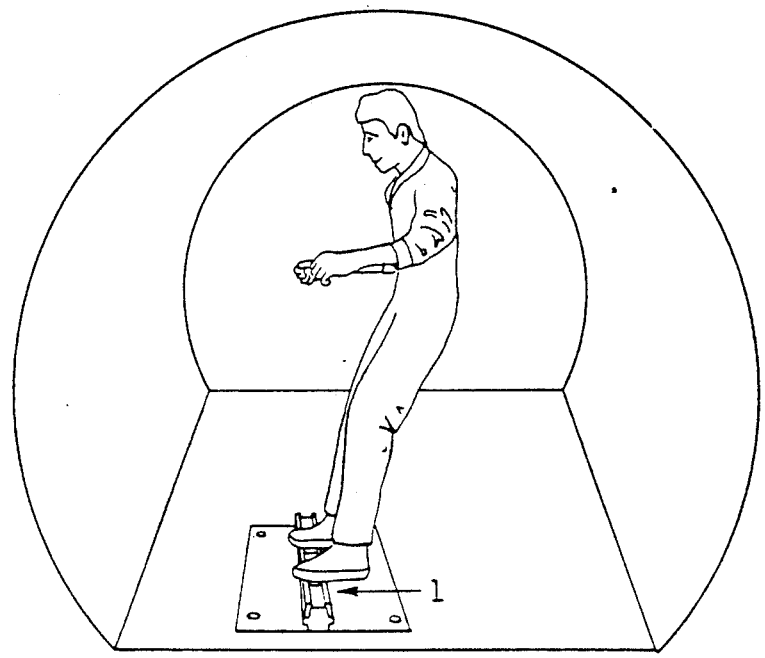
FIG. 1 is a schematic perspective view of a worker in a zero gravity environment having his feet secured to the floor of a micro gravity compartment by a restraining apparatus embodying this invention.

Referring to FIG. 1, there is schematically shown a work person, such as an astronaut, disposed within a compartment having a micro gravity environment with his shoes anchored to the floor of the compartment by a restraining device 1 embodying this invention. It should be understood that restraining device 1 could be mounted on any wall, including the ceiling, of the compartment, depending upon what position is the most convenient for the astronaut to assume when performing a specified task. Obviously, the shoe restraining device 1 could also be mounted in the cargo bay of a space shuttle or any compartment where zero or micro gravity conditions exist.

Figure 2:
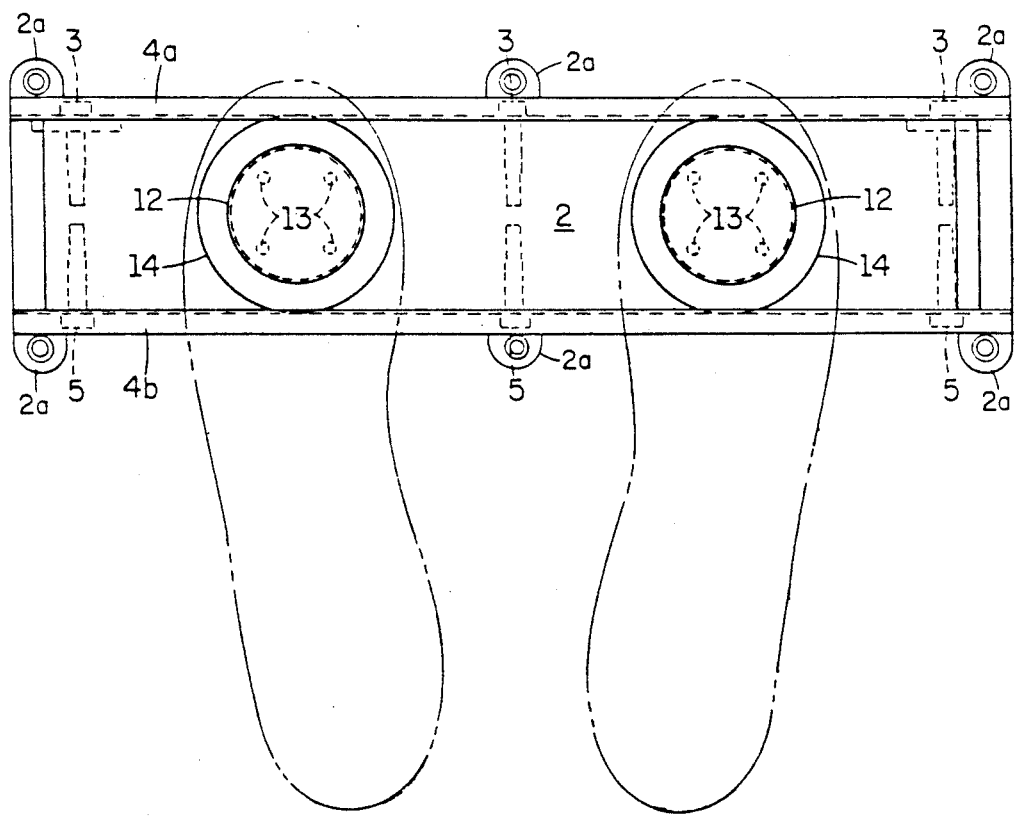
FIG. 2 is a top elevational view of the restraining apparatus that is securable to a floor or any other wall of the micro gravity compartment.
Figure 3:
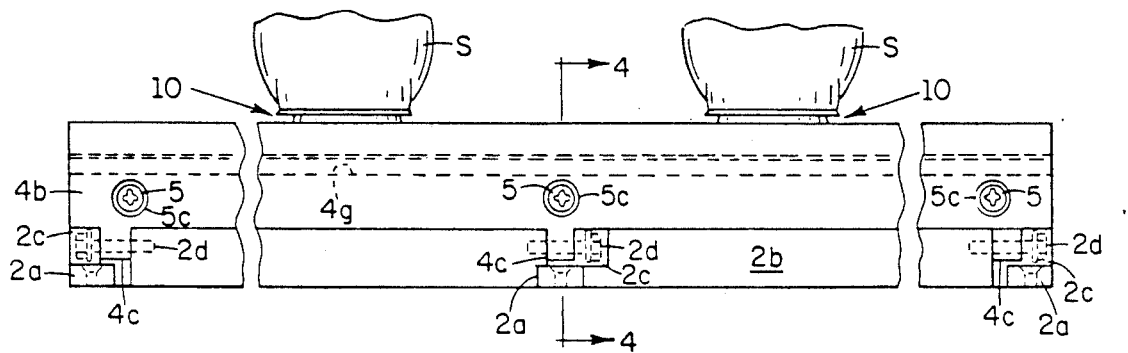
FIG. 3 is a side elevational view of FIG. 2.
Figure 4:
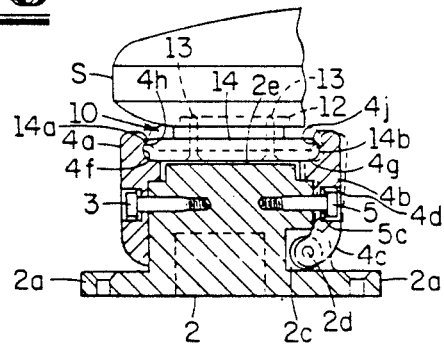
FIG. 4 is a sectional view taken on the plane 4-4 of FIG. 3.

Referring to FIGS. 2-4 of the drawings, the restraining device of this invention comprises an elongated base element 2 having laterally projecting flanges 2a for securement of the base element to the floor or any wall of a micro gravity compartment. For convenience of reference, but not as a limitation, it will be assumed that the base element 2 is secured to the floor of a micro gravity compartment.

A pair of restraining bars 4a and 4b are respectively mounted on opposite sides of the base element 2. One restraining device 4a is rigidly secured to the base element 2 by a plurality of longitudinally spaced bolts 3. The other restraining bar 4b is provided with longitudinally spaced, inwardly curved projections 4c at its bottom end which respectively fit into an elongated recess 2b provided in the adjacent side of the base element 2. Longitudinally spaced flanges 2c traverse the recess 2b and the inward projections 4c of the restraining rail 4b are pivotally secured to such flanges by pivot bolts 2d. Thus, the top end portion of the restraining bar 4b is laterally movable relative to the upper end of the restraining bar 4a. Such movement is, however, limited by a plurality of longitudinally spaced bolts 5 which respectively traverse bore holes 4d provided in the movable restraining bar 4b and are threadably engaged with the base element 2. Intermediate the heads 5a of the bolts 5 and the base of a counterbore 4e, Bellville type spring washers 5c are provided to impart a transverse bias to the movable restraining bar 4b, thus urging it to a minimum spacing position relative to the fixed restraining bar 4a.

As is readily apparent from the drawings, the top portions of both the restraining bars 4a and 4b extend above the top surface 2e of the base element 2. The inner walls of the top portions of restraining bars 4a and 4b are respectively provided with opposed parallel grooves 4f and 4g respectively. Such grooves thus define a longitudinally extending track. It will be noted that the inner top corners of restraining bars 4a and 4b are respectively provided with convex rounded surfaces 4h and 4j for a purpose to hereinafter described.

The aforedescribed elements of the restraining apparatus 1 are all fixedly mounted in the micro gravity compartment. The cooperating apparatus comprises a cleat assemblage 10 which is secured to the bottom of one or both shoes of the person to be restrained.

The cleat assemblage 10 as shown in FIG. 4 comprises a metallic plate 12 which is embedded in, or otherwise suitably secured to the bottom of each shoe S. A flanged cleat unit 14 is then secured to such plate by a plurality of bolts 13. The flanged cleat 14 is of circular configuration and defines a peripheral flange 14a which has convex upper and bottom peripheral edges. The diameter of the flange 14a is selected to be substantially equal to the minimum spacing between the grooves 4f and 4g of the restraining rails 4a and 4b. Thus, when the flange 14a is inserted in the grooves 4f and 4g, the shoe to which the flanged cleat 14 is secured will be secured against any vertical movements relative to the secured base 2, but can be pivoted by the shoe about the axis of the circular flange portion 14a. Thus, the person wearing shoes S can approach the shoe restraining device 1 from any angle and effect securement of a shoe or shoes.

A particular feature of this invention lies in the method of inserting the flanged portion 14a of the cleat assemblage 10 into the restraining track defined by the laterally spaced grooves 4a and 4b. If an attempt is made to just push the flanged cleat 14 downwardly and thus force its entry into the opposed grooves 4f and 4g, the reaction force would operate in the micro gravity environment to displace the body of the person a substantial distance away from the restraining device. Instead, the insertion of the flanged cleat is accomplished by a pivotal movement in a vertical plane. Thus the one semicircular edge of the flange 14a is inserted in one of the grooves 4g and 4h and the opposite edge is inserted in the other groove by a pivotal movement in a vertical plane relative to the horizontal base element 2. This results in an upward force on the one restraining rail 4a and a downward force on the other restraining rail 4b, thus equalizing such forces and imparting no significant displacement force to the shoe or to the person wearing the shoe.

The spring pressure exerted on the flanged cleat 14 is not so large as to prevent longitudinal movement of the shoe or shoes along the grooves 4f and 4g.

It should also be noted that pivotal movement of each foot can be readily accomplished about the axis of the cleat flange 14, thus permitting the body of the astronaut to be readily turned to face in any direction up to the point where the twisting of the astronaut's body would be prevented by interengagement of his legs.

Figure 5:
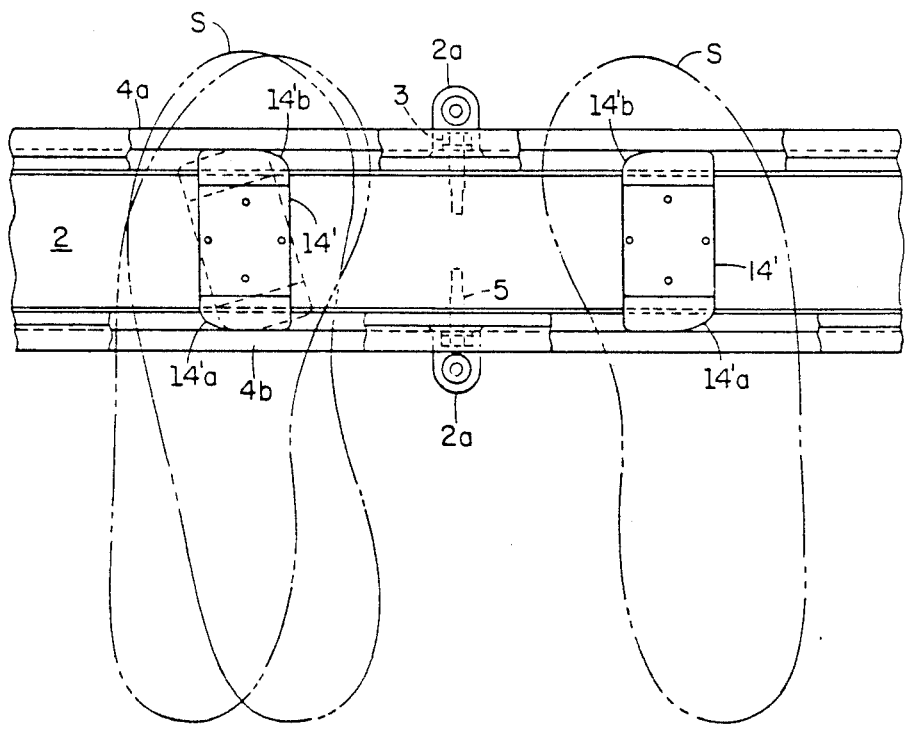
FIG. 5 is a view similar to FIG. 2 but illustrating a modified form of shoe cleat.

Referring now to FIG. 5, a modification of this invention is illustrated wherein the cleat flange 14' is provided with a generally rectangular configuration having two diagonally opposed rounded corners 14'a and 14'b. The longitudinal dimension of the rectangular configuration is substantially equal to the minimum spacing between the restraint grooves 4f and 4g and the insertion of the modified cleat flange 14' into such grooves is accomplished in the same manner as previously described.

The advantage of the construction of this modification is that pivotal movement of one foot will expand the spacing between the side rails 4a and 4b and thus permit the other foot to be freely moved along the length of the grooves 4f and 4g. Following such movement, the foot that is moved can be pivoted to separate the restraining rails 4a and 4b and the first mentioned foot can then be moved to a normal position adjacent the foot that was first moved.

Figure 6:
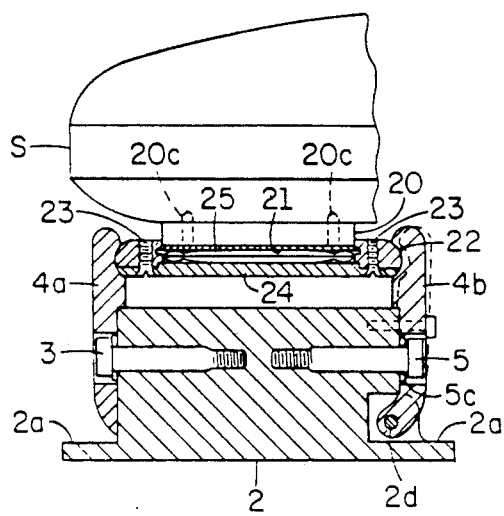
FIG. 6 is a vertical sectional view of a still further modified shoe cleat which incorporates a flange defining element which is ratchetingly mounted on the shoe cleat to permit pivoting of the shoe with respect to the flange element which is restrained within the fixed restraining apparatus.
Figure 7:
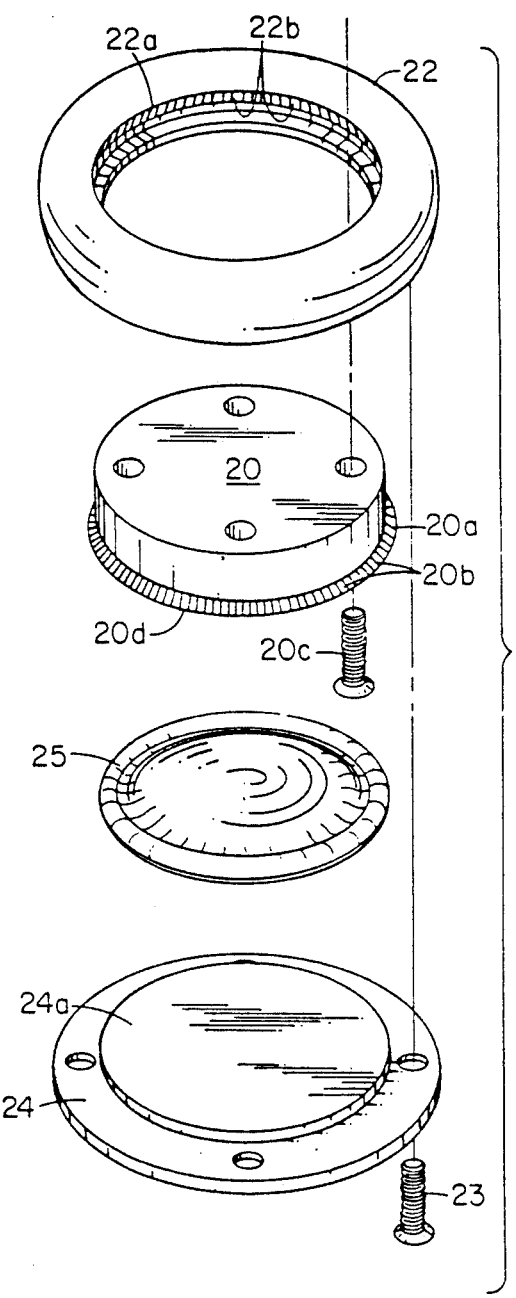
FIG. 7 is an exploded perspective view of the cleat of FIG. 6.

Referring now to FIG. 6 and 7, there is shown a still further modification of the cleat flange which provides a selected degree of pivotal movement of the cleat flanges relative to the restraining grooves 4f and 4g. In this modification, the circular mounting element 20 for securing the cleat flange to the bottom of the shoe by bolts 20c is provided with an outwardly angled peripheral shoulder 20a having a plurality of upwardly facing serrations 20b formed in such shoulder. The flanged element of the cleat assembly is now defined by a two-piece unit respectively comprising an annular ratcheting ring 22 to which is secured a solid base ring 24 by a plurality of peripherally spaced screws 23. The annular ratcheting ring 22 is provided with a downwardly facing inclined surface 22a which, in turn, is provided with a plurality of peripherally spaced serrations 22b which cooperate with the upwardly facing serrations 20b. A space 21 is defined between the bottom face 20d of the mounting base 20 and the top face 24a of a solid circular base 24. A wave spring 25 is mounted in the space 21 and maintains an axial bias between base 24 and mounting element 20 holding the serrations 22b in engagement with the serrations 20b. The peripheries of the annular ratcheting element 22 and the base element 24 are provided with a semi-circular convex, cross-sectional configuration so as to snugly cooperate with the restraint grooves 4f and 4g in the same manner as previously described for flange 14a.

The assemblage of this modified cleat unit to the restraint rails 4a and 4b is accomplished in the same manner as previously described, namely by a vertical pivotal movement of the modified cleat flange so as to engage one side of the flange portion of the cleat with a groove 4f or 4g and then subsequently engage the other groove by reverse pivotal movement in a vertical plane, thereby eliminating any significant net upward force on the shoe. When it is desired to pivot either shoe relative to the base 2, a downward force must be exerted by the foot sufficient to disengage the serrations 20b from the serrations 22b, and then the foot may be freely pivoted to the desired extent. When such downward force is not applied, the interengagement of the serrations 20b and 22b prevent accidental or undesired pivoting of the wearer's shoes relative to the restraint device.

The advantages of the aforedescribed modifications of a restraint device for use by workers in a micro gravity environment are readily apparent to those skilled in the art. It should be mentioned, however, that the principles of the invention are equally applicable to restraint devices that may be required in a normal gravity environment. For example, in the treatment of invalids or aged people, it may often be desirable to positively restrain their feet from movement while they are exercising other portions of their body. Many people cannot perform the exercise and maintain their balance on their feet and a restraint device embodying the principles of this invention will readily overcome that problem.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A restraining system especially suited for a low gravity environment comprising, in combination:
   an elongated base element having means thereon for securement in a desired location, said base element having parallel generally vertical side walls when the base element is horizontally disposed;
   a pair of parallel, restraining plates secured to said side walls and projecting above said base element;
   means for laterally shiftably mounting the top portion of at least one of said restraining plates relative to said base plate, whereby the lateral spacing of the upper portions of said restraining plates may be varied;
   resilient means urging said one restraining plate to a minimum lateral spacing position relative to the other restraining plate;
   said restraining plates respectively having longitudinal grooves in their inner surfaces disposed in opposed parallel relationship to define a restraining track;
   a restraint cleat attachable to the bottom of a shoe when worn by a person; and
   said restraint cleat defining a horizontal flange dimensioned to fit within said restraining track when said restraining plates are disposed in said minimum lateral spacing position and to pass between the top edges of said restraining plates when said one restraining plate is shifted laterally relative to said other restraining plate.

2. A restraining system especially suited for a low gravity environment comprising, in combination:
   an elongated base element having means thereon for securement in a desired location, said base element having parallel generally vertical side walls when the base element is horizontally disposed;
   a pair of parallel restraining plates secured to said side walls and projecting above said base element;
   means for laterally shiftably mounting the top portion of at least one of said restraining plates relative to said base plate, whereby the lateral spacing of the upper portions of said restraining plates may be varied;
   resilient means urging said one restraining plate to a minimum lateral spacing position relative to the other restraining plate;
   said restraining plates respectively having longitudinal grooves in their inner surfaces disposed in opposed parallel relationship to define a restraining track;
   a restraint cleat attachable to the bottom of a shoe when worn by a person;
   said restraint cleat defining a horizontal flange dimensioned to fit within said restraining track when said restraining plates are disposed in said minimum lateral spacing position and to pass between the top edges of said restraining plates when said one restraining plate is shifted laterally relative to said other restraining plate; and
   cooperating camming surfaces on the top edges of said restraining plates and the bottom edges of said restraint cleat flange to move said top edges apart by insertion of said horizontal flange therebetween by pivotal movement in a vertical plane permitting said flange to enter said restraining track to secure the shoe against vertical movement relative to said base but permit longitudinal movement of the shoe along said restraining track.

3. The restraint apparatus of claim 1 wherein said restraint cleat flange is of circular configuration, thereby permitting entry of said flange into said restraining track from any horizontal approach angle and further permitting horizontal rotation of the shoe through 360° while confined in said restraint track.

4. The restraint apparatus of claim 1 wherein said cleat restraint flange has a rectangular configuration with rounded corners, the large dimension of said rectangular configuration corresponding to the minimum width of said restraining track, whereby twisting of the shoe effects lateral expansion of said restraining track.

5. The restraint apparatus of claim 1 wherein said restraint cleat comprises a circular disc attachable to the bottom of a shoe; said disc having upwardly facing serrations around its periphery;

- a housing having an annular wall surrounding said circular disc and having downwardly facing periphery serrations on the inner surface of said annular wall engagable with said upwardly facing serrations;
- the periphery of said housing defining said restraint cleat flange; and
- resilient means intermediate said circular disc and said housing urging said housing downwardly to engage said serrations, thereby requiring a downward force from said shoe to release said shoe for pivoting movement in a horizontal plane.

6. The restraint apparatus of claim 1 wherein said means for laterally shiftably mounting said one restraining plate comprises a pair of lateral projections on the bottom end portions of said one restraining plate; and

- pivot means securing said lateral projections to said base element.

7. The restraint apparatus of claim 6 wherein said resilient means comprises a bolt horizontally traversing an unthreaded bore in said one restraining plate and threadably secured to said base element; and

- Bellville spring washer means interposed between the head of said bolt and said one restraining plate.

8. The method of restraining personnel working in a substantially zero gravity environment comprising the steps of:

- securing an elongated base adjacent to a work station;
- mounting elongated rails respectively on the sides of said elongated base for limited transverse movement relative to each other and spring biased to a minimum lateral spacing;
- providing opposed, parallel longitudinal grooves respectively in the inner faces of said elongated rails;
- providing a convex surface from the top of each said groove to the top of the respective rail;
- mounting a cleat on the bottom of at least one of the shoes of the worker; said cleat having rigid flanges engagable within said grooves when said rails are in their spring biased minimum spacing positions;
- said flanges having convex peripheral surfaces; and
- inserting said cleat flanges into said grooves by a vertical pivotal movement of the shoe, whereby an upward force is exerted on one groove and a downward force on the other groove to neutralize upward reaction forces on said shoe during insertion of said cleat in said grooves.

* * * * *